US010206407B2

(12) United States Patent
Larson (10) Patent No.: US 10,206,407 B2
(45) Date of Patent: Feb. 19, 2019

(54) CARCASS CABINET SYSTEM AND METHOD FOR ANTIMICROBIAL TREATMENT OF ANIMAL CARCASSES

(71) Applicant: JBS USA, LLC, Greeley, CO (US)

(72) Inventor: LaWayne Larson, Fort Collins, CO (US)

(73) Assignee: JBS USA, LLC, Greeley, CO (US)

( * ) Notice: Subject to any disclaimer, the term of this patent is extended or adjusted under 35 U.S.C. 154(b) by 125 days.

(21) Appl. No.: 15/255,897

(22) Filed: Sep. 2, 2016

(65) Prior Publication Data

US 2017/0238563 A1 Aug. 24, 2017

Related U.S. Application Data

(60) Provisional application No. 62/214,729, filed on Sep. 4, 2015.

(51) Int. Cl.
| | |
|---|---|
| *A22B 5/00* | (2006.01) |
| *A22B 7/00* | (2006.01) |
| *A22C 21/00* | (2006.01) |

(52) U.S. Cl.
CPC ............ *A22B 5/0082* (2013.01); *A22B 7/002* (2013.01); *A22C 21/0061* (2013.01)

(58) Field of Classification Search
CPC ........... A22B 5/00; A22B 5/0082; A22B 7/02; A22C 21/0061
USPC .................................................. 452/177–183
See application file for complete search history.

(56) References Cited

U.S. PATENT DOCUMENTS

| | | | |
|---|---|---|---|
| 4,852,216 A | 8/1989 | Clayton et al. | |
| 4,862,557 A | 9/1989 | Clayton et al. | |
| 5,374,433 A | 12/1994 | Bowling et al. | |
| 5,576,035 A | 11/1996 | Bowling et al. | |
| 5,853,320 A | 12/1998 | Wathes et al. | |
| 5,869,113 A | 2/1999 | Clayton et al. | |
| 5,980,375 A * | 11/1999 | Anderson | A22B 5/0082 452/77 |
| 6,019,033 A * | 2/2000 | Wilson | A23B 4/0053 126/20 |
| 6,039,984 A | 3/2000 | Bowling et al. | |
| 6,287,610 B1 | 9/2001 | Bowling et al. | |
| 6,569,474 B2 | 5/2003 | Clayton et al. | |
| 6,605,308 B2 * | 8/2003 | Shane | A23B 4/24 134/25.3 |
| 6,742,720 B2 | 6/2004 | Nolen | |
| 6,964,788 B2 | 11/2005 | Phebus et al. | |
| 7,169,415 B2 | 1/2007 | Bowling et al. | |
| 7,870,822 B2 * | 1/2011 | Adams | A23B 4/24 422/119 |

(Continued)

*Primary Examiner* — Richard T Price, Jr.
(74) *Attorney, Agent, or Firm* — Sheridan Ross P.C.

(57) ABSTRACT

An apparatus and method for applying an antimicrobial agent to whole or split animal carcasses include a closed or essentially closed chamber for limiting the escape of antimicrobial agent to the environment during antimicrobial treatment of the carcass. In one embodiment, a series of carcass cabinet panels moves in line with the passing animal carcass and forms an enclosure around the carcass by means of panels closing ahead of and behind the carcass. In another embodiment, the direction and spray pattern of positively charged aerosolized antimicrobial particles in a carcass cabinet is controlled by attracting the particles to preselected negatively charged regions within the carcass cabinet.

8 Claims, 9 Drawing Sheets

(56) References Cited

U.S. PATENT DOCUMENTS

| | | | |
|---|---|---|---|
| 8,012,002 B2* | 9/2011 | Brown | A22B 5/0082 |
| | | | 452/173 |
| 8,246,429 B2* | 8/2012 | Hilgren | A22C 21/0061 |
| | | | 452/123 |
| 8,388,422 B2* | 3/2013 | Clayton | A01K 13/002 |
| | | | 452/173 |
| 8,684,799 B2* | 4/2014 | Brink | A22C 21/0061 |
| | | | 452/173 |
| 8,715,759 B2 | 5/2014 | Larson | |
| 2004/0052702 A1 | 3/2004 | Shuman et al. | |
| 2009/0081317 A1 | 3/2009 | McNaughton et al. | |
| 2009/0196967 A1 | 8/2009 | Nolen et al. | |
| 2010/0093266 A1 | 4/2010 | Chattin et al. | |
| 2011/0086146 A1 | 4/2011 | Knueven | |
| 2011/0136421 A1 | 6/2011 | Brink et al. | |
| 2012/0225171 A1 | 9/2012 | Garwood | |
| 2013/0231034 A1 | 9/2013 | O'Neil et al. | |
| 2014/0017364 A1 | 1/2014 | Liimatta | |
| 2016/0088846 A1 | 3/2016 | Lemons | |
| 2016/0174585 A1 | 6/2016 | Massey et al. | |

\* cited by examiner

CARCASS CABINET SYSTEM AND METHOD FOR ANTIMICROBIAL TREATMENT OF ANIMAL CARCASSES

CROSS-REFERENCE TO RELATED APPLICATION

This application claims the benefit of U.S. Provisional Patent Application 62/214,729, filed 4 Sep. 2015, the entire disclosure of which is incorporated herein by reference.

FIELD OF THE INVENTION

This disclosure relates to apparatuses, methods, and systems for applying an antimicrobial treatment agent to an animal carcass, and in particular to carcass cabinets therefor.

DESCRIPTION OF THE RELATED ART

Currently, the most commonly used method for antimicrobial treatment of animal carcasses is hot water pasteurization. Hot water pasteurization is a "flood" technology, relying on a large volume of water to ensure that each carcass is fully covered or surrounded and exposed to heat across its entire surface to reduce the levels of pathogens. One common type of pasteurization "cabinet" known in the art is a one-piece cabinet, comprising a portion that encloses one or more carcasses to hold steam. The one-piece cabinet moves forward and back, in a straight line, to enclose the carcass.

One-piece cabinets suffer from a number of drawbacks. The number of intervention technologies and practices that can be used in conjunction with a one-piece cabinet is strictly limited. One-piece cabinets can also be dangerous to workers in the immediate proximity of the cabinet. Furthermore, it can be difficult to assess and ensure complete coverage of the carcass with an intervention or treatment agent.

There is thus a long-felt need for devices, systems, and methods for antimicrobial treatment of animal carcasses that allows a wider range of intervention technologies and practices while safeguarding worker welfare. It is advantageous for such devices, systems, and methods to reliably ensure that the entire surface of the carcass is covered or surrounded by an intervention or treatment agent.

BRIEF SUMMARY OF THE INVENTION

The invention provides a retractable carcass cabinet, comprising a top enclosure, comprising a leading top panel, a center top panel, and a trailing top panel; and a bottom enclosure, comprising a leading bottom panel, a center bottom panel, and a trailing bottom panel, wherein the top and bottom enclosures are configured to move between a retracted position and a sealing position, and wherein, when the top and bottom enclosures are in a sealing position, the top and bottom enclosures together form a substantially airtight closed chamber.

In some embodiments, the retractable carcass cabinet may further comprise an electrostatic nozzle, disposed on an underside of the center top panel and adapted to provide an electrostatic spray of an antimicrobial agent into the substantially airtight closed chamber; an evacuation port, disposed on the bottom enclosure and adapted to evacuate the substantially airtight closed chamber; and a relief air port, disposed on the bottom enclosure and adapted to inject air into the substantially airtight closed chamber.

In some embodiments, a carcass hook may be disposed through a sealed opening in the top enclosure and extend below the top enclosure. The carcass hook may be attached to a carcass chain above the top enclosure. The center top panel may be attached to a top enclosure drive chain at an upper contact point on an overside of the center top panel, and the center bottom panel may be attached to a bottom enclosure drive chain at a lower contact point on an underside of the center bottom panel.

The invention also provides a system for antimicrobial treatment of an animal carcass, comprising a retractable carcass cabinet, a carcass chain, a top enclosure drive chain, and a bottom enclosure drive chain. The retractable carcass cabinet comprises a top enclosure, comprising a leading top panel, a center top panel, and a trailing top panel; a bottom enclosure, comprising a leading bottom panel, a center bottom panel, and a trailing bottom panel; an electrostatic nozzle, disposed on an underside of the center top panel; an evacuation port, disposed on the bottom enclosure; and a relief air port, disposed on the bottom enclosure, wherein the top and bottom enclosures are configured to move between a retracted position and a sealing position. The carcass chain drives a carcass hook, the carcass hook suspending the animal carcass between the top enclosure and the bottom enclosure. The top enclosure drive chain is attached to the center top panel at an upper contact point on an overside of the center top panel. The bottom enclosure drive chain is attached to the center bottom panel at a lower contact point on an underside of the center bottom panel. The top enclosure drive chain and the bottom enclosure drive chain move the top enclosure and the bottom enclosure, respectively, to align the top and bottom enclosures with the animal carcass. When the top and bottom enclosures are in a sealing position, the top and bottom enclosures together form a substantially airtight closed chamber surrounding the animal carcass.

In some embodiments, the animal carcass may be a whole animal carcass. The whole animal carcass may, by way of non-limiting example, be a cattle carcass, a pig carcass, a sheep carcass, a sheep carcass, a chicken carcass, a turkey carcass, or a carcass of a bird other than a chicken or a turkey.

In some embodiments, the animal carcass may be a portion of a carcass of an animal that has been cut, split, or otherwise separated from a remainder of the carcass. The animal may, by way of non-limiting example, be cattle, a pig, a sheep, a chicken, a turkey, or a bird other than a chicken or a turkey.

The invention further provides a method for continuous antimicrobial treatment of animal carcasses. In the first step of the method, a retractable carcass cabinet is provided at a process starting point, the retractable carcass cabinet comprising a top enclosure, a bottom enclosure, an electrostatic nozzle, an evacuation port, and a relief air port, wherein the top and bottom enclosures are configured to move between a retracted position and a sealing position. The method further comprises suspending an animal carcass between the top enclosure and the bottom enclosure by a carcass hook; driving the carcass hook along a carcass chain; driving the top enclosure along a top enclosure drive chain and the bottom enclosure along a bottom enclosure drive chain, so that the top and bottom enclosures are aligned with the animal carcass; moving the top and bottom enclosures from the retracted position to the sealing position; electrostatically spraying an antimicrobial agent into the substantially airtight closed chamber; evacuating the substantially airtight closed chamber; providing relief air into the substantially airtight closed chamber; moving the top and bottom enclosures from the sealing position to the retracted position; and driving the top enclosure along the top enclosure drive chain and the bottom enclosure along the bottom enclosure drive chain to return the top and bottom enclosures to the process starting point. The top enclosure comprises a leading top panel, a center top panel, and a trailing top panel. The bottom enclosure comprises a leading bottom panel, a center bottom panel, and a trailing bottom panel. The electrostatic nozzle is disposed on an underside of the center top panel. The evacuation port is disposed on the bottom enclosure. The relief air port is disposed on the top enclosure.

In some embodiments, the animal carcass may be a whole animal carcass. The whole animal carcass may, by way of non-limiting example, be a cattle carcass, a pig carcass, a sheep carcass, a sheep carcass, a chicken carcass, a turkey carcass, or a carcass of a bird other than a chicken or a turkey.

In some embodiments, the animal carcass may be a portion of a carcass of an animal that has been cut, split, or otherwise separated from a remainder of the carcass. The animal may, by way of non-limiting example, be cattle, a pig, a sheep, a chicken, a turkey, or a bird other than a chicken or a turkey.

The invention still further provides a system for antimicrobial treatment of at least one animal carcass, comprising a plurality of carcass cabinet walls, defining an interior volume; a plurality of electrostatic nozzles, aerosolizing a liquid antimicrobial agent to form aerosolized antimicrobial particles, imparting a positive charge to the aerosolized antimicrobial particles, and spraying the aerosolized antimicrobial particles into the interior volume; a carcass chain, carrying the at least one animal carcass and driving the at least one animal carcass through the interior volume such that at least a first portion of the aerosolized antimicrobial particles adheres to a surface of the at least one animal carcass to form a substantially uniform layer of the antimicrobial agent; a plurality of negatively charged electromagnets, each negatively charged electromagnet imparting a negative charge to an evacuation region within the interior volume to attract at least a second portion of the aerosolized antimicrobial particles into the evacuation region; and a plurality of evacuation columns, each evacuation column associated with at least one negatively charged electromagnet and evacuating substantially all of the aerosolized antimicrobial particles within the evacuation region from the interior volume.

In some embodiments, the at least one animal carcass may comprise a whole animal carcass. The whole animal carcass may, by way of non-limiting example, be a cattle carcass, a pig carcass, a sheep carcass, a sheep carcass, a chicken carcass, a turkey carcass, or a carcass of a bird other than a chicken or a turkey.

In some embodiments, the at least one animal carcass may comprise a portion of a carcass of an animal that has been cut, split, or otherwise separated from a remainder of the carcass. The animal may, by way of non-limiting example, be cattle, a pig, a sheep, a chicken, a turkey, or a bird other than a chicken or a turkey.

In some embodiments, the carcass cabinet walls may comprise stainless steel.

In some embodiments, the aerosolized antimicrobial particles may have an average diameter of between about 20 microns and about 60 microns.

In some embodiments, an attractive force between the surface of the at least one animal carcass and the layer of the antimicrobial agent may be equal to about 75 times the force of gravity.

The invention yet further provides a method for continuous antimicrobial treatment of animal carcasses, comprising the steps of a) providing a plurality of carcass cabinet walls defining an interior volume; b) aerosolizing a liquid antimicrobial agent to form aerosolized antimicrobial particles; c) imparting a positive charge to the aerosolized antimicrobial particles; d) spraying the aerosolized antimicrobial particles into the interior volume; e) driving at least one animal carcass through the interior volume such that at least a first portion of the aerosolized antimicrobial particles adheres to a surface of the at least one animal carcass to form a substantially uniform layer of the antimicrobial agent; f) imparting a negative charge to at least one evacuation region within the interior volume to attract at least a second portion of the aerosolized antimicrobial particles into the at least one evacuation region; and g) evacuating substantially all of the aerosolized antimicrobial particles within the evacuation region from the interior volume.

In some embodiments, the at least one animal carcass may comprise a whole animal carcass. The whole animal carcass may, by way of non-limiting example, be a cattle carcass, a pig carcass, a sheep carcass, a sheep carcass, a chicken carcass, a turkey carcass, or a carcass of a bird other than a chicken or a turkey.

In some embodiments, the at least one animal carcass may comprise a portion of a carcass of an animal that has been cut, split, or otherwise separated from a remainder of the carcass. The animal may, by way of non-limiting example, be cattle, a pig, a sheep, a chicken, a turkey, or a bird other than a chicken or a turkey.

In some embodiments, the carcass cabinet walls may comprise stainless steel.

In some embodiments, the aerosolized antimicrobial particles may have an average diameter of between about 20 microns and about 60 microns.

In some embodiments, an attractive force between the surface of the at least one animal carcass and the layer of the antimicrobial agent may be equal to about 75 times the force of gravity.

These and other advantages will be apparent from the disclosure contained herein.

For purposes of further disclosure and to comply with applicable written description and enablement requirements, the following references generally relate to systems and methods for antimicrobial treatment of animal carcasses and for related systems and methods, and are hereby incorporated by reference in their entireties:

U.S. Pat. No. 4,852,216, entitled "Animal slaughtering chemical treatment and method," issued 1 Aug. 1989 to Clayton et al. ("Clayton I"). Clayton I describes a material and method for processing meat in production in which the meat, both carcass and head, which can proceed on different production lines, is rinsed and treated with acetic acid after hide removal. The water and acid are maintained at a temperature of between 80 and 150° F. The acid is in a water-based solution at concentrations ranging from 0.25% to 2.00%. After evisceration for the carcass and removal of waste from the head, the head and carcass are rinsed and treated with acetic acid again before being sent to cold storage, from which they are released later for further processing. The first rinsing step is commenced within one hour of the time the hide is removed from the animal.

U.S. Pat. No. 4,862,557, entitled "Animal slaughtering chemical treatment and method," issued 5 Sep. 1989 to Clayton et al. ("Clayton II"). Clayton II describes a material and method for processing meat in production in which the meat, both carcass and head, which can proceed on different production lines, is rinsed and treated with acetic acid after hide removal. The water and acid are maintained at a temperature of between 80 and 150° F. The acid is in a water-based solution at concentrations ranging from 0.25% to 2.00%. After evisceration for the carcass and removal of waste from the head, the head and carcass are rinsed and treated with acetic acid again before being sent to cold storage, from which they are released later for further processing. The first rinsing step is commenced within one hour of the time the hide is removed from the animal.

U.S. Pat. No. 5,374,433, entitled "Method for preserving food products," issued 20 Dec. 1994 to Bowling et al. ("Bowling I"). Bowling I describes a method for preserving a food product, such as meat. The method comprises the steps of inoculating meat with an effective amount of euhygienic non-pathogenic, non-spoilage bacteria in order to competitively inhibit the growth of undesired pathogenic and spoilage bacteria. Preferably, either *L. delbrueckii* or *Hafnia alvei* bacteria are used to inoculate a meat product. Bacteria present on a meat product are first reduced to a number below about 5,000 bacteria per gram of meat, e.g. by dehairing an animal and then spraying the meat with an organic acid prior to inoculation with euhygienic bacteria. The meat product is then vacuum packaged and stored in a refrigerated environment of about −1° C. to about 7° C. Meat products preserved in accordance with the method of the invention can enjoy a refrigerated shelf life of up to about 150 days without surface discoloration or the generation of undesirable gaseous byproducts.

U.S. Pat. No. 5,576,035, entitled "Method for preserving food products and food products made thereby," issued 19 Nov. 1996 to Bowling et al. ("Bowling II"). Bowling II describes a method for preserving a food product, such as meat. The method comprises the steps of inoculating meat with an effective amount of non-pathogenic, non-spoilage bacteria in order to competitively inhibit the growth of undesired pathogenic and spoilage bacteria. Preferably, either *L. delbrueckii* or *Hafnia alvei* bacteria are used to inoculate a meat product. Bacteria present on a meat product are first reduced to a number below about 5,000 bacteria per gram of meat, e.g. by dehairing an animal and then spraying the meat with an organic acid prior to inoculation with bacteria. The meat product is then vacuum packaged and stored in a refrigerated environment of about −1° C. to about 7° C. Meat products preserved in accordance with the method of the invention can enjoy a refrigerated shelf life of up to about 150 days without surface discoloration or the generation of undesirable gaseous byproducts.

U.S. Pat. No. 5,853,320, entitled "Plucking apparatus for poultry," issued 29 Dec. 1998 to Wathes et al. ("Wathes"). Wathes describes a plucking apparatus for plucking poultry carcasses on a shackle line including a plurality of individual plucking units, one for each of a number of carcasses to be plucked at any one time, and shielding means included in or provided additionally to said plucking units, whereby the plucking heads of each said unit are shielded from the plucking heads of the neighboring units during plucking.

U.S. Pat. No. 5,869,113, entitled "Method for preserving food products and food products made thereby," issued 9 Feb. 1999 to Clayton et al. ("Clayton III"). Clayton III describes a method for preserving a food product, such as meat, using the steps of inoculating meat with an effective amount of euhygienic non-pathogenic, non-spoilage bacteria in order to competitively inhibit the growth of undesired pathogenic and spoilage bacteria. Edible films that incorporate and/or cover euhygienic bacteria on the food product are used to ensure competitive inhibition of undesired spoilage and pathogenic bacteria.

U.S. Pat. No. 5,980,375, entitled "Method and apparatus for antimicrobial treatment of animal carcasses," issued 9 Nov. 1999 to Anderson et al. ("Anderson"). Anderson describes a two-step antimicrobial treatment of animal carcasses prior to chill storage in a commercial slaughter operation. As a first step, the carcass is isolated in a hot water pasteurization chamber and sprayed with recirculation water at a temperature of at least 165° F. over its entire surface for a time sufficient to kill bacteria. Isolation is achieved with air curtains across the entrance and exit openings, an exhaust system, and a liquid level control in the bottom of the chamber. Recirculation water collected in the bottom of the chamber is filtered, combined with makeup water, heated, and recirculated to the chamber. As a second step, the carcass is isolated in an acid application chamber and sprayed with an organic acid solution immediately prior to delivery to the chill storage.

U.S. Pat. No. 6,039,984, entitled "Method for treating a food processing facility," issued 21 Mar. 2000 to Bowling et al. ("Bowling III"). Bowling III describes a method for preserving a food product, such as meat, comprising the steps of inoculating meat with an effective amount of euhygienic non-pathogenic, non-spoilage bacteria in order to competitively inhibit the growth of undesired pathogenic and spoilage bacteria. Edible films that incorporate and/or cover euhygienic bacteria on the food product are used to ensure competitive inhibition of undesired spoilage and pathogenic bacteria.

U.S. Pat. No. 6,287,610, entitled "Method for increasing the tenderness of a meat product," issued 11 Sep. 2001 to Bowling et al. ("Bowling IV"). Bowling IV describes a method for preserving a food product, such as meat, including the steps of inoculating meat with an effective amount of euhygienic non-pathogenic, non-spoilage bacteria in order to competitively inhibit the growth of undesired pathogenic and spoilage bacteria. Edible films that incorporate and/or cover euhygienic bacteria on the food product are used to ensure competitive inhibition of undesired spoilage and pathogenic bacteria.

U.S. Pat. No. 6,569,474, entitled "System for preserving food products," issued 27 May 2003 to Clayton et al. ("Clayton IV"). Clayton IV describes a method for preserving a food product, such as meat, including the steps of inoculating meat with an effective amount of euhygienic non-pathogenic, non-spoilage bacteria in order to competitively inhibit the growth of undesired pathogenic and spoilage bacteria. Edible films that incorporate and/or cover euhygienic bacteria on the food product are used to ensure competitive inhibition of undesired spoilage and pathogenic bacteria.

U.S. Patent Application Publication No. 2004/0052702, entitled "Food product surface sterilization apparatus and method," published 18 Mar. 2004 to Shuman et al. ("Shuman").

U.S. Pat. No. 6,742,720, entitled "Spray application system," issued 1 Jun. 2004 to Nolen ("Nolen I").

U.S. Pat. No. 6,964,788, entitled "System for handling processed meat and poultry products," issued 15 Nov. 2005 to Phebus et al. ("Phebus").

U.S. Pat. No. 7,169,415, entitled "System for preserving fresh meat products," issued 30 Jan. 2007 to Bowling et al.

("Bowling V"). Bowling V describes a method for preserving a food product, such as meat, comprising the steps of inoculating meat with an effective amount of euhygienic non-pathogenic, non-spoilage bacteria in order to competitively inhibit the growth of undesired pathogenic and spoilage bacteria. Edible films that incorporate and/or cover euhygienic bacteria on the food product are used to ensure competitive inhibition of undesired spoilage and pathogenic bacteria.

U.S. Patent Application Publication No. 2009/0081317, entitled "Microbiocidal control in the processing of meat-producing four-legged animals," published 26 Mar. 2009 to McNaughton et al. ("McNaughton").

U.S. Patent Application Publication No. 2009/0196967, entitled "Application system with recycle and related use of antimicrobial quaternary ammonium compound," published 6 Aug. 2009 to Nolen et al. ("Nolen II").

U.S. Patent Application Publication No. 2010/0093266, entitled "Machine for scrubbing exterior of fowl and method of use thereof," published 15 Apr. 2010 to Chattin et al. ("Chattin"). Chattin describes a machine for scrubbing a fowl, wherein the machine comprises at least one pair of opposing rotating brushes, wherein the fowl passes between said at least one pair of opposing rotating brushes. The pair of opposing rotating brushes comprises a first rotating scrubber and a second rotating scrubber having bristles extending therefrom. The fowl is suspended via a shackle suspended from a track, wherein the height of the scrubbing machine may be selectively varied via a threaded height adjuster. The bristles of the machine are rotated, wherein the bristles contact the exterior of fowl traveling through the machine. Jets of water or other cleaning fluid spray inwardly to reach the fowl and the scrubbing bristles to rinse removed material from the fowl and bristles. The brushes are rotated through hubs attached to gears powered by a motor, wherein the gears may be selectively rotated in either direction.

U.S. Patent Application Publication No. 2011/0086146, entitled "Antimicrobial compositions for meat processing," published 14 Apr. 2011 to Knueven ("Knueven"). Knueven describes a method and composition for reducing microbes during a meat processing operation. The composition includes an acid blend that is a blend of (a) an organic acid selected from the group consisting of lactic acid, acetic acid, and mixtures thereof, and (b) a second material selected from the group consisting of alkali metal salts of inorganic acids, mineral acids, and mixtures thereof.

U.S. Patent Application Publication No. 2011/0136421, entitled "Cleaning apparatus and method," published 9 Jun. 2011 to Brink et al. ("Brink"). Brink describes an apparatus and method for cleaning carcasses and a device for mixing a cleaning substance that can be used in such applications. In some embodiments, the apparatus and method utilize a multi-phase cleaning substance spraying procedure in which the cleaning substance has desired levels of chlorine dioxide and is delivered to the carcasses at desired flow rates, both of which can vary between phases of the procedure and/or at different locations of the carcasses being cleaned.

U.S. Patent Application Publication No. 2012/0225171, entitled "Method for controlling water content with decontamination in meats," published 6 Sep. 2012 to Garwood ("Garwood"). Garwood describes a method for producing treated meat having a predetermined proportion of water in a container. The method includes treating meat that has lost water content through evaporation with an agent capable of killing bacteria together with an amount of water, wherein the amount of water corresponds to the amount of water that is lost through evaporation. The method provides meat being treated with a bactericidal agent as well as providing meat with the predetermined amount of water for packaging.

U.S. Patent Application Publication No. 2013/0231034, entitled "Method and apparatus for processing livestock carcasses to destroy microorganisms," published 5 Sep. 2013 to O'Neil et al. ("O'Neil").

U.S. Patent Application Publication No. 2014/0017364, entitled "Microbiocidal control in the processing of meat-producing four-legged animals," published 16 Jan. 2014 to Liimatta ("Liimatta"). U.S. Pat. No. 8,715,759, entitled "Method and apparatus for antimicrobial treatment of meat trimmings for subsequent grinding," issued 6 May 2014 to Larson ("Larson"). Larson describes an antimicrobial intervention for the production of ground meats by treating the exterior of the meat trimmings with an antimicrobial agent before grinding. An apparatus for applying an antibacterial agent to meat trimmings includes a closed or essentially closed chamber for limiting the escape of the antimicrobial agent to the environment during antimicrobial treatment of the trimmings, an entrance system for introducing trimmings into the closed chamber while prevent or significantly limiting the antimicrobial agent from escaping into the environment, an application system for applying an effective amount of the antimicrobial agent to exposed surfaces of the trimmings in the closed chamber, and an exit system for removing the treated trimmings from the closed container while preventing or significantly limiting the escape of antimicrobial agent into the environment.

U.S. Patent Application Publication No. 2016/0088846, entitled "Antimicrobial compositions and methods of use thereof," published 31 Mar. 2016 to Lemons ("Lemons").

U.S. Patent Application Publication No. 2016/0174585, entitled "Anti-microbial application equipment with controls," published 23 Jun. 2016 to Massey et al. ("Massey").

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Unless defined otherwise, all technical and scientific terms used herein have the same meaning as is commonly understood by one of ordinary skill in the art. All patents, applications, published applications, and other publications to which reference is made herein are incorporated by reference in their entirety. In the event that there is a plurality of definitions for a term herein, the definition provided in the Brief Summary of the Invention prevails unless otherwise stated.

As used herein, the term "animal carcass" is used to mean both a whole animal carcass, and any portion of a carcass of an animal which has been cut, split, or otherwise separated from a remainder of the carcass.

Referring now to FIGS. 1 through 6, an apparatus for applying an antimicrobial agent to whole or split animal carcasses includes a closed or essentially closed chamber for limiting the escape of antimicrobial agent to the environment during antimicrobial treatment of the carcass. A series of carcass cabinet panels move in line with the passing animal carcass and form an enclosure around the carcass by means of panels closing ahead of and behind the carcass. The center carcass cabinet panel remains parallel to the carcass on either side of the moving carcass. The leading and trailing carcass cabinet panels move the panel edged furthest from the center panel toward a position directly below the carcass main chain. Each carcass cabinet center panel, in conjunction with the attached forward and trailing panels, forms a 180-degree enclosure around the target carcass. Two separate 180-degree enclosures come together to form a single 360-degree enclosure that surrounds the carcass by carcass cabinet walls. The carcass cabinet center panels on either side of the carcass are bent at a 90-degree angle toward the center chain at the top and bottom of the cabinet panel. The carcass cabinet panels that lead and trail the center panel are also bent at a 90-degree angle toward the main chain. The cabinet panel ends (including the upper and lower leading, center, and trailing panels) form a closed end on the top and bottom of the 360-degree carcass enclosure. The carcass hook attached to the main chain is the only point at which the enclosure is not fully separated from the exterior environment. The hole in the top of the 360-degree enclosure, by means of some expansive or rubber material, is sealed to prevent antimicrobial escape from around the carcass hook.

When the enclosure is fully sealed, nozzles installed toward the top of both center panels commence the antimicrobial application process. The process fully covers the carcass by means of electrostatic nozzles that create an attraction between the aerosolized antimicrobial agent and the contained carcass.

Air-assisted electrostatic sprayers produce electrically charged spray droplets of the antimicrobial agent, which are carried to the target carcass in an air stream. Electrical charges on the surface of the spray particles cause the particles to be attracted to the target carcass. The charged spray particles follow electric field lines around the target carcass, wrapping around the carcass and coating it on all sides.

The enclosed carcass chamber is then evacuated by means of a port located toward the lower end of the center cabinet panels. A source of relief air is drawn into the full enclosure through an upper port, allowing the chamber air, including the aerosolized antimicrobial, to be evacuated through the lower evacuation port.

When completely evacuated, the carcass cabinet begins the chamber separation process, starting with the leading edge of the forward panel. The forward panels falls back to be in line with the center panel, as does the panel trailing the center panel. The three connected panels are then parallel to the moving carcass. The panels then move along a route defined by drive chains located at upper and lower contact points of the carcass cabinet panel. The cabinet panel chains and connected panels make a 180-degree turn away from the moving carcass, toward the process starting point, and then make a second 180-degree turn, toward the next moving carcass. The process then repeats.

The retractable carcass cabinet temporarily creates an individual chamber around each carcass while moving at speeds typical of an industrial processing chain. The closed or essentially closed chamber allows for the use of a wide range of intervention technologies and practices while safeguarding worker welfare in the immediate vicinity.

Electrostatic application of antimicrobial agents results in aerosolization of the antimicrobial agents, with particle sizes between about 20 and about 60 microns. These particles receive an electrical charge from the spray nozzle, causing the particles to be attracted to the surface of the target carcass by a force about 75 times stronger than gravity. The small particles adhere to the carcass in a highly uniform, thin layer, resulting in more complete coverage. The enclosure also allows for increased concentrations of antimicrobial agents or other intervention compounds, as the chamber prevents escape to the surrounding work area.

The retractable carcass cabinet enables continuous processing of large numbers of animal carcasses, surrounding each carcass as it passes (while being driven by a carcass hook/chain), and then retracts away after treatment of each carcass.

Figure 1:
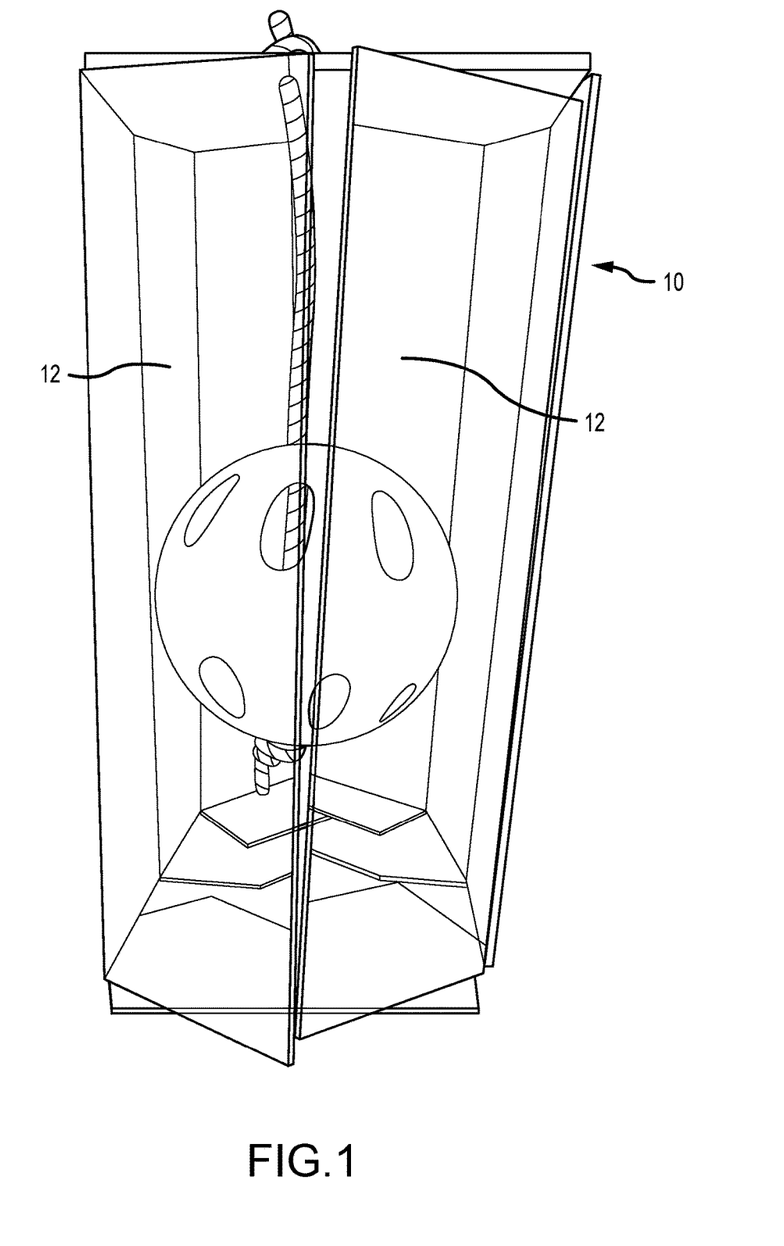
FIG. 1 is a front view of a scale model of a prototype carcass cabinet, according to embodiments of the present invention.
Figure 2:
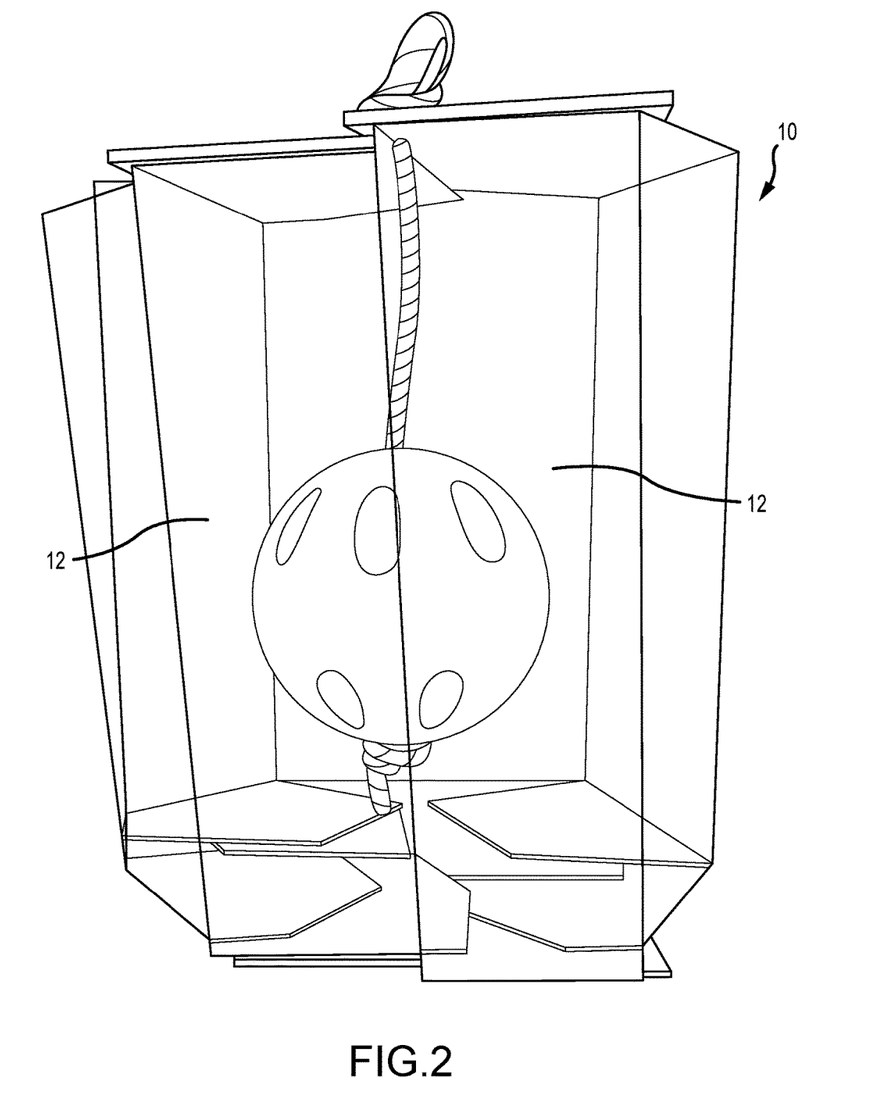
FIG. 2 is a side view of a scale model of a prototype carcass cabinet, according to embodiments of the present invention.
Figure 3:
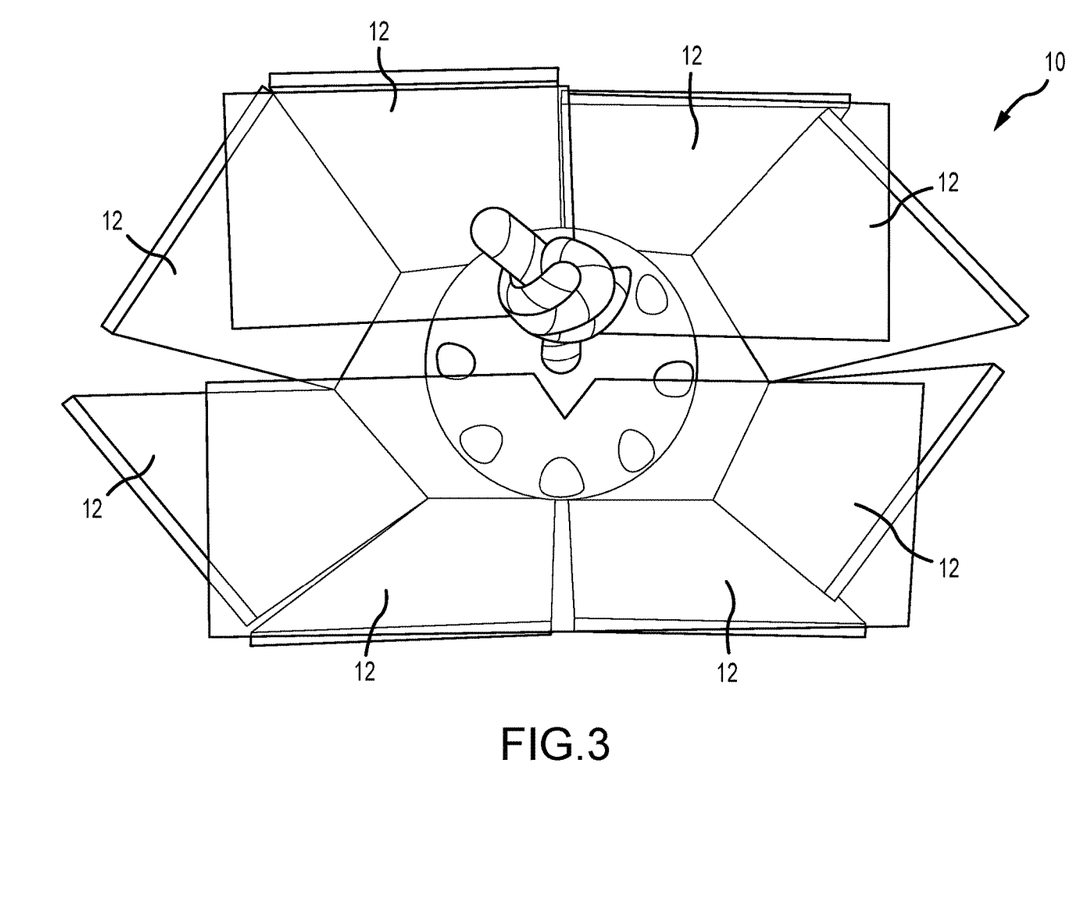
FIG. 3 is a top view of a scale model of a prototype carcass cabinet, according to embodiments of the present invention.
Figure 4:
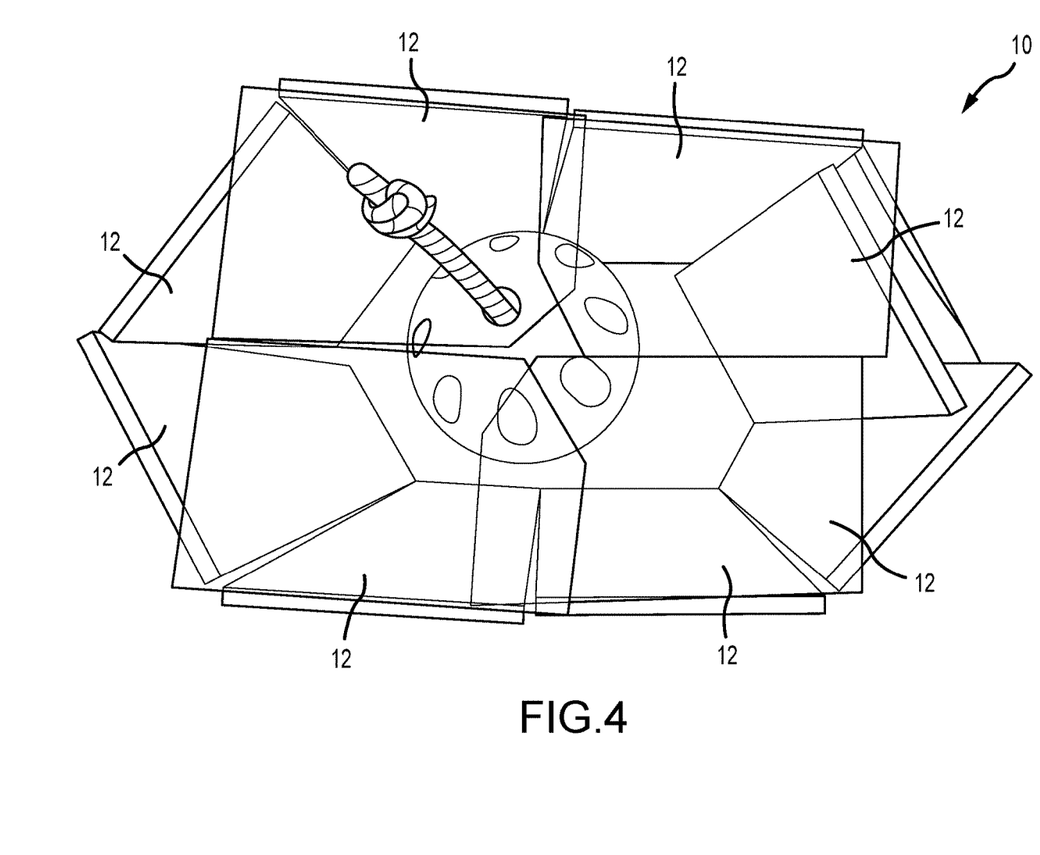
FIG. 4 is a bottom view of a scale model of a prototype carcass cabinet, according to embodiments of the present invention.
Figure 5:
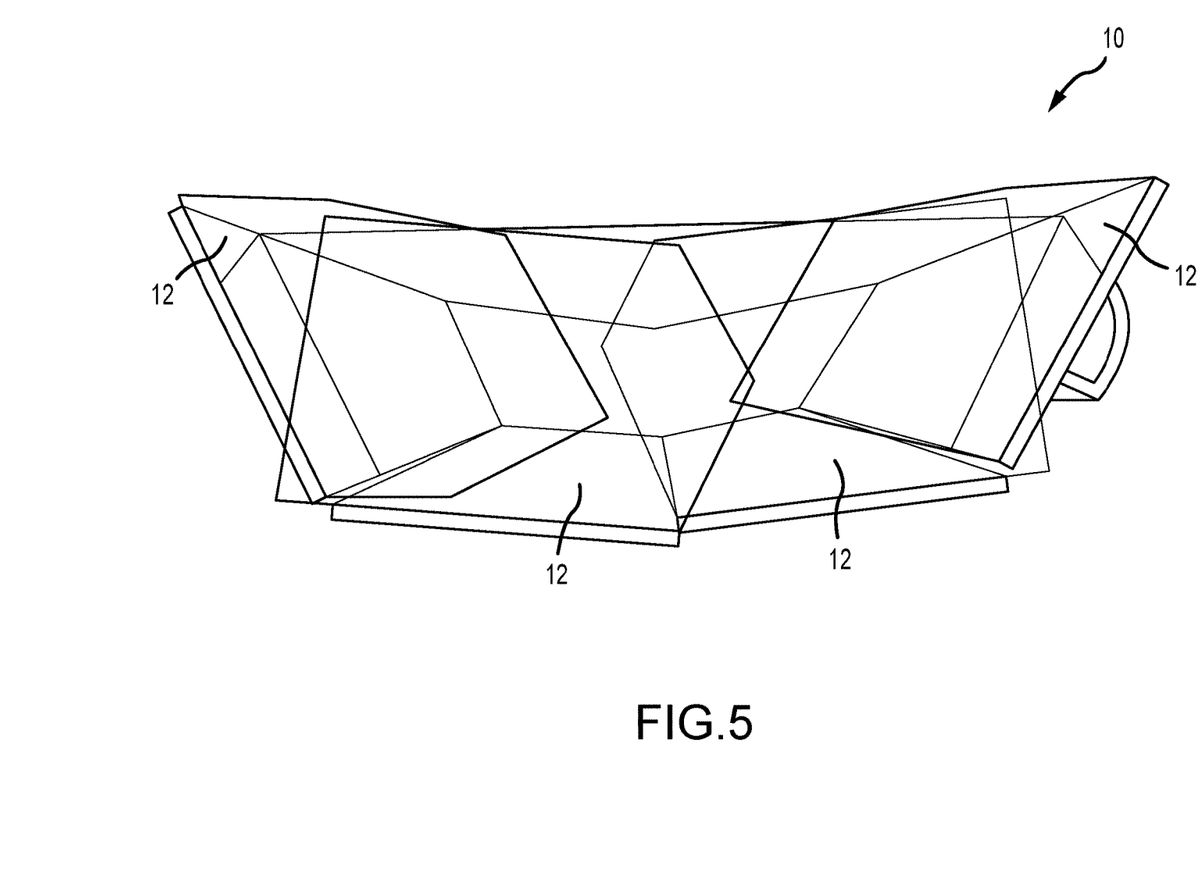
FIG. 5 is a top view of a scale model of a prototype carcass cabinet closure, according to embodiments of the present invention.
Figure 6:
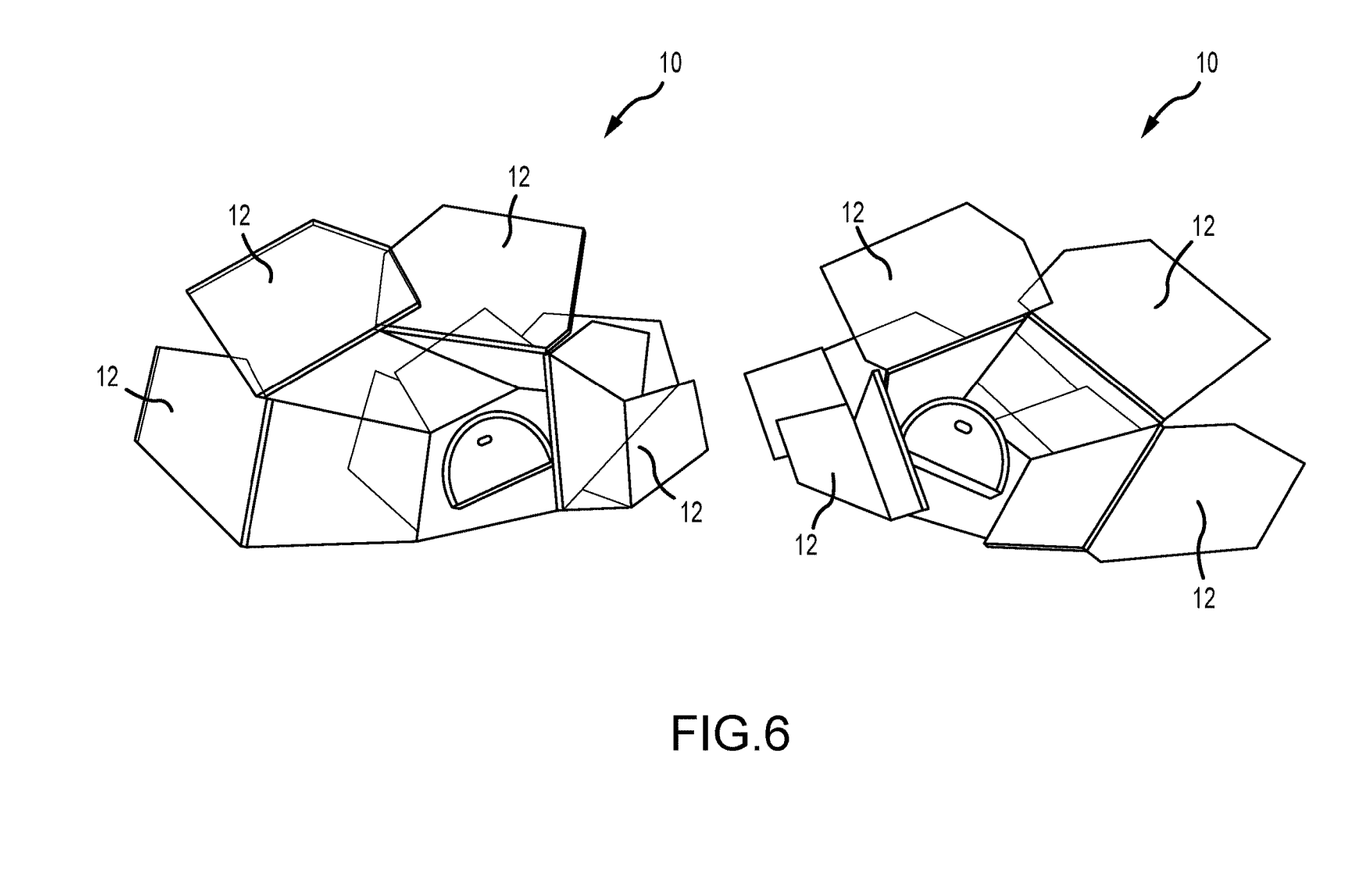
FIG. 6 is a perspective view of an exploded scale model of a prototype carcass cabinet, according to embodiments of the present invention.
Figure 7:
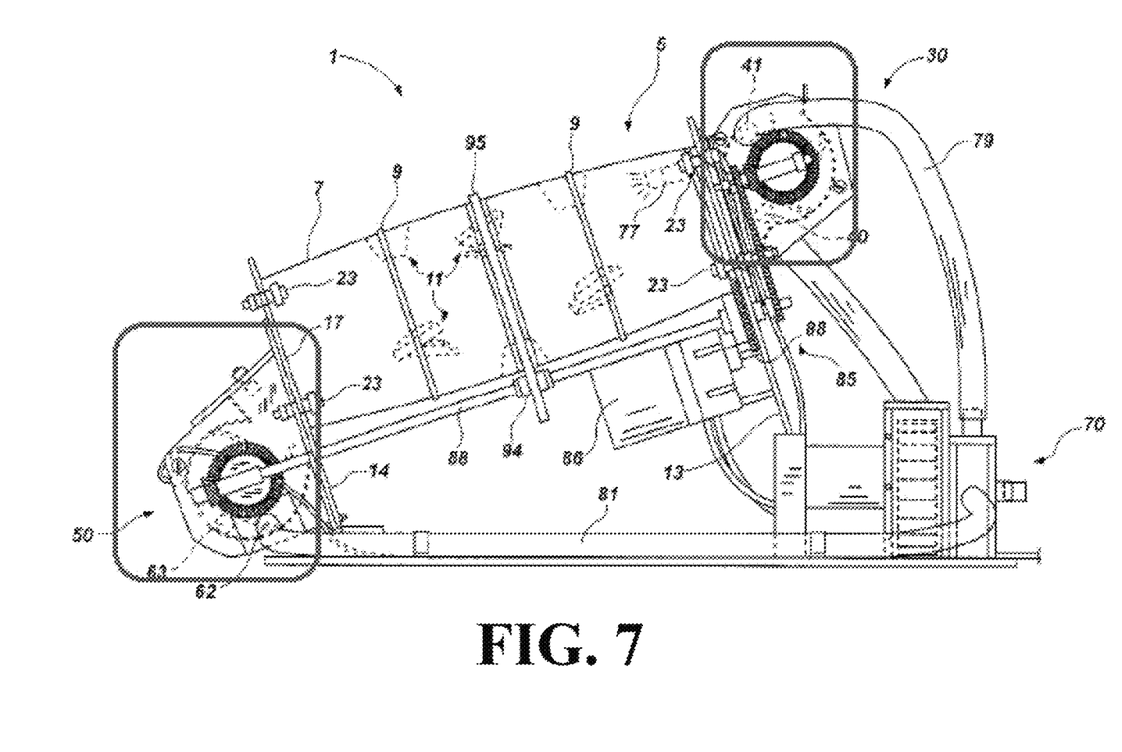
FIG. 7 is an illustration of a prior art apparatus for antimicrobial treatment of meat products.

Prior art apparatuses for antimicrobial treatment of meat products generally prevent charged particulate from escaping from an enclosure by means of physical barriers, typically in the form of revolving doors or evacuation of air, as illustrated in the two highlighted portions of FIG. 7. In addition to necessitating additional moving parts, which are prone to wear and eventual failure, prior art apparatuses tend to give an operator little to no control over the direction and spray pattern of charged particulate.

Figure 8:
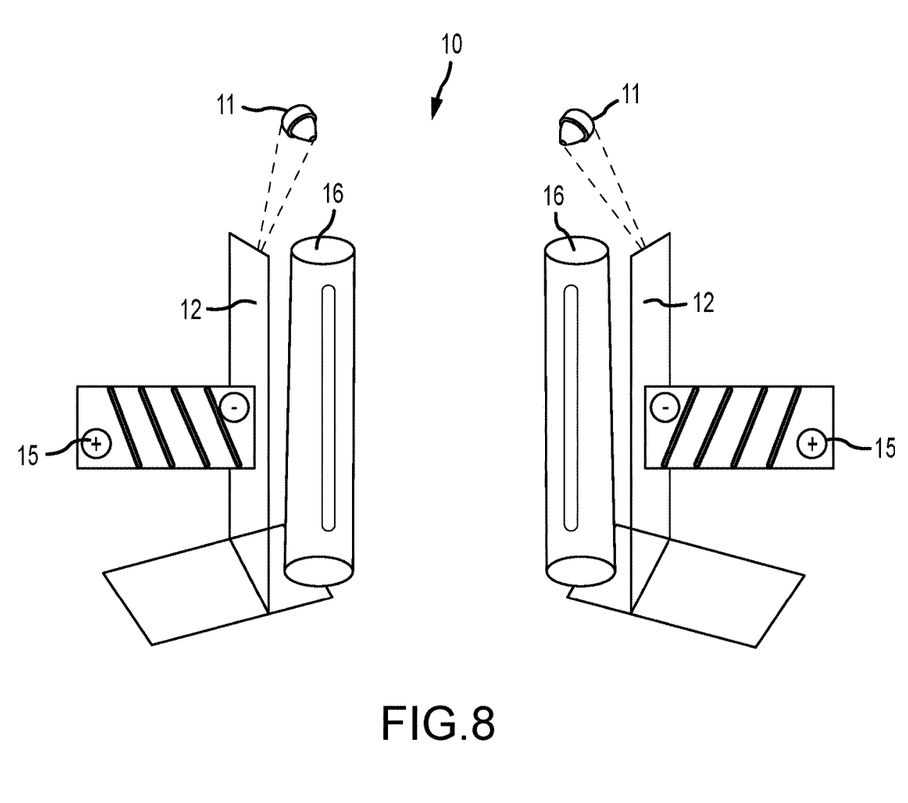
FIG. 8 is a side view of a carcass cabinet system, according to embodiments of the present invention.
Figure 9:
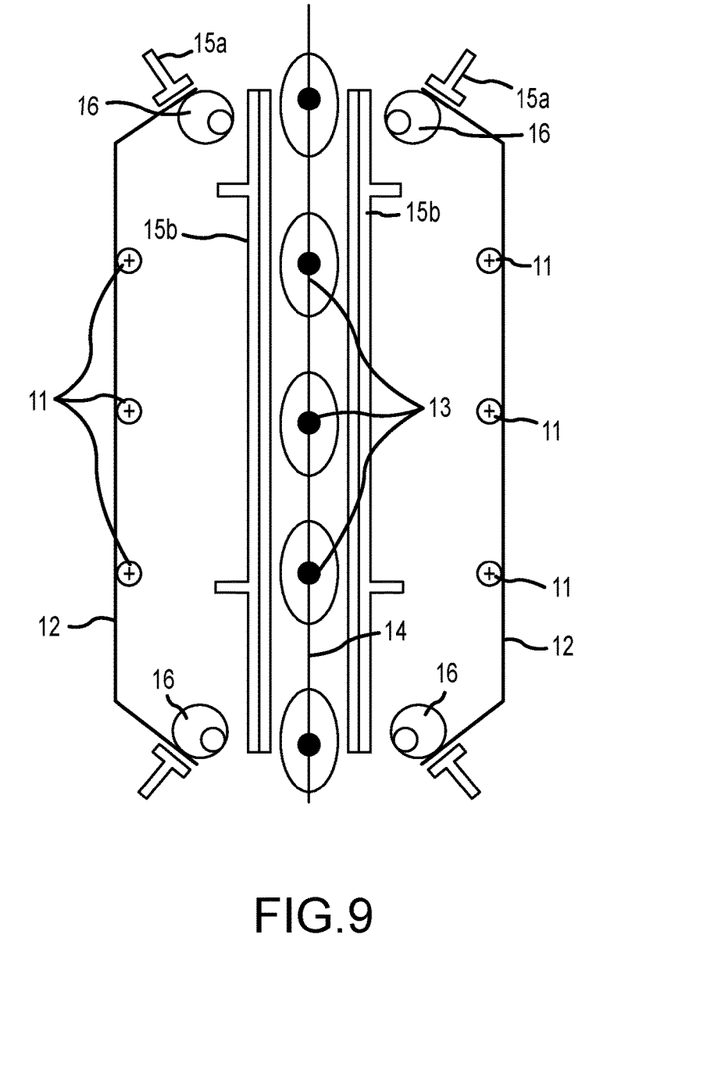
FIG. 9 is an overhead view of a carcass cabinet system, according to embodiments of the present invention.

Referring now to FIGS. 8 and 9, in contrast to the prior art, carcass cabinet systems of the present invention do not rely solely on physical barriers to prevent charged particulate from escaping. As illustrated in FIGS. 8 and 9, in carcass cabinet systems 10 of the present invention, electrostatic nozzles 11 are fixed on carcass cabinet walls 12. In embodiments, the carcass cabinet walls 12 may be made of stainless steel. Electrostatic nozzles 11 aerosolize a liquid antimicrobial agent and impart a positive charge to the aerosolized antimicrobial particles. In embodiments, the aerosolized antimicrobial particles may have an average diameter of between about 20 microns and about 60 microns. As a result of their positive charge, the aerosolized antimicrobial particles are attracted to the surfaces of carcasses 13, which are driven, by a carcass chain 14, through an interior space defined by carcass cabinet walls 12. In embodiments, the attractive and/or adhesive force between the surfaces of carcasses 14 and the aerosolized antimicrobial particles may be about 75 times the force of gravity. In the embodiment illustrated in FIG. 9, carcass cabinet walls 12 may define an interior space sufficient to accommodate multiple carcasses 13 at the same time. The positive charge of the aerosolized antimicrobial particles also serves to distribute the antimicrobial agent evenly over the surfaces of carcasses 13.

Although the use of electrostatic nozzles to impart a positive charge on aerosolized antimicrobial particles is effective to sterilize the surfaces of carcasses 13, the aerosolized particles may, without intervention, have a tendency to drift outside the carcass cabinet walls 12 and adhere to unintended surfaces, including workers in the near vicinity of the carcass cabinet system 10. In particular, particles are liable to escape through the points at which carcasses 13 enter and exit the cabinet, as well as through unsealed gaps at the top of the interior space surrounding the carcass chain 14. This problem of unintended drift is solved by ensuring that the positively charged antimicrobial particles pass through a negatively charged magnetic field. As illustrated in FIG. 9, negatively charged electromagnets 15a,b are provided at various points in the carcass cabinet walls 12. The electromagnets 15 attract the positively charged antimicrobial particles, ensuring that the particles do not escape from the carcass cabinet walls 12. In embodiments, electromagnets 15 may be side electromagnets 15a, i.e. disposed on an interior surface of vertical carcass cabinet walls 12, or they may be overhead electromagnets 15b, i.e. disposed on an interior surface of a ceiling or roof of carcass cabinet walls 12. No matter their placement, however, electromagnets 15 are oriented to impart a negative magnetic charge into the interior space defined by carcass cabinet walls 12. As a result of their attraction to electromagnets 15, the positively charged antimicrobial particles will not drift toward gaps or holes by which they may escape into a surrounding environment. As antimicrobial particles are drawn toward electromagnets 15, they are captured and removed from the interior space by air/particulate evacuation columns 16.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow. By way of non-limiting example, though the foregoing description of the invention has related to animal carcasses, systems and methods according to the invention may sterilize the surfaces of fruits and vegetables without departing from the spirit and scope of the invention. Likewise, by way of further non-limiting example, the negatively charged electromagnets as described may be replaced by static or rare-earth magnets without departing from the spirit and scope of the invention. Similarly, by way of additional non-limiting example, though the foregoing description of the invention has related to a positively charged aerosol spray and a negatively charged electromagnet, those of ordinary skill in the art would be able to understand and implement the converse, i.e. negatively charged aerosol spray and positively charged electromagnets, without departing from the spirit and scope of the invention.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

The invention claimed is:

1. A method for continuous antimicrobial treatment of animal carcasses, comprising:
 a) providing a plurality of carcass cabinet walls defining an interior volume;
 b) aerosolizing a liquid antimicrobial agent to form aerosolized antimicrobial particles;
 c) imparting a positive charge to the aerosolized antimicrobial particles;
 d) spraying the aerosolized antimicrobial particles into the interior volume;
 e) driving at least one animal carcass through the interior volume such that at least a first portion of the aerosolized antimicrobial particles adheres to a surface of the at least one animal carcass to form a substantially uniform layer of the antimicrobial agent;
 f) imparting a negative charge to at least one evacuation region within the interior volume to attract at least a second portion of the aerosolized antimicrobial particles into the at least one evacuation region; and
 g) evacuating substantially all of the aerosolized antimicrobial particles within the evacuation region from the interior volume.

2. The method of claim 1, wherein the at least one animal carcass comprises a whole animal carcass.

3. The method of claim 2, wherein the whole animal carcass comprises a whole bird carcass.

4. The method of claim 1, wherein the at least one animal carcass comprises a portion of a carcass of an animal that has been cut, split, or otherwise separated from a remainder of the carcass.

5. The method of claim 4, wherein the animal is a bird.

6. The method of claim 1, wherein the carcass cabinet walls comprise stainless steel.

7. The method of claim 1, wherein the aerosolized antimicrobial particles have an average diameter of between about 20 microns and about 60 microns.

8. The method of claim 1, wherein an attractive force between the surface of the at least one animal carcass and the layer of the antimicrobial agent is equal to about 75 times the force of gravity.

* * * * *